United States Patent [19]
Nishiyama et al.

[11] Patent Number: 5,950,007
[45] Date of Patent: Sep. 7, 1999

[54] METHOD FOR COMPILING LOOPS CONTAINING PREFETCH INSTRUCTIONS THAT REPLACES ONE OR MORE ACTUAL PREFETCHES WITH ONE VIRTUAL PREFETCH PRIOR TO LOOP SCHEDULING AND UNROLLING

[75] Inventors: Hiroyasu Nishiyama, Kawasaki; Sumio Kikuchi, Machida, both of Japan

[73] Assignee: Hitachi, Ltd., Tokyo, Japan

[21] Appl. No.: 08/675,964

[22] Filed: Jul. 5, 1996

[30] Foreign Application Priority Data

Jul. 6, 1995 [JP] Japan .................................. 7-170674

[51] Int. Cl.⁶ .................................................... G06F 9/45
[52] U.S. Cl. ........................................ 395/707; 395/705
[58] Field of Search ................................. 395/705, 706, 395/707, 709, 710

[56] References Cited

U.S. PATENT DOCUMENTS

| | | | |
|---|---|---|---|
| 5,303,357 | 4/1994 | Inoue et al. | 395/709 |
| 5,367,651 | 11/1994 | Smith et al. | 395/709 |
| 5,491,823 | 2/1996 | Ruttenberg | 395/709 |
| 5,557,761 | 9/1996 | Chan et al. | 395/709 |
| 5,664,193 | 9/1997 | Tirumalai | 395/705 |
| 5,704,053 | 12/1997 | Santhanam | 395/383 |
| 5,752,037 | 5/1998 | Gornish et al. | 395/709 |
| 5,761,515 | 6/1998 | Barton, III et al. | 395/709 |
| 5,794,029 | 8/1998 | Babaian et al. | 395/588 |
| 5,797,013 | 8/1998 | Mahadevan et al. | 395/709 |
| 5,809,308 | 9/1998 | Tirumalai | 395/709 |
| 5,819,088 | 10/1998 | Reinders | 395/672 |
| 5,835,776 | 11/1998 | Tirumalai et al. | 395/709 |

OTHER PUBLICATIONS

S. Ramakrishnan, "Software Pipelining in PA–RISC Compilers," Hewlett–Packard Journal, Jun. 1992, pp. 39–45.

T. Mowry et al, "Design and Evaluation of a Compiler Algorithm for Prefetching," Proceedings of the Fifth International Conference on Architectural Support for Programming Language and Operating Systems, 1992, pp. 62–73.

D. Callahan et al, "Software Prefetching," 1991 ACM 0–89791–380, pp. 40–52.

G. Kurpanek et al, "PA7200: A PA–RISC Processor with Integrated High Performance MP Bus Interface," Hewlett–Packard Company, 1994 IEEE, pp. 375–382.

Primary Examiner—Zarni Maung
Assistant Examiner—Andrew Caldwell
Attorney, Agent, or Firm—Fay, Sharpe, Beall, Fagan, Minnich & McKee

[57] ABSTRACT

Prefetch instructions having a function to move data to a cache memory from main memory are scheduled simultaneously with execution of other instructions. The prefetch instructions are scheduled by replacing, with the original prefetch instructions, the virtual prefetch instructions obtained by unrolling a kernel section of the schedule constituted by generating a dependency graph having dependent relationships between the prefetch instruction and the memory reference instruction, and then applying the software pipelining thereto, or by further unrolling the kernel section of the constituted schedule to delete the redundant prefetch instructions, or further by applying the software pipelining to the dependency graph which is formed by combining a plurality of prefetch instructions and replacing the prefetch instructions with virtual prefetch instructions.

6 Claims, 16 Drawing Sheets

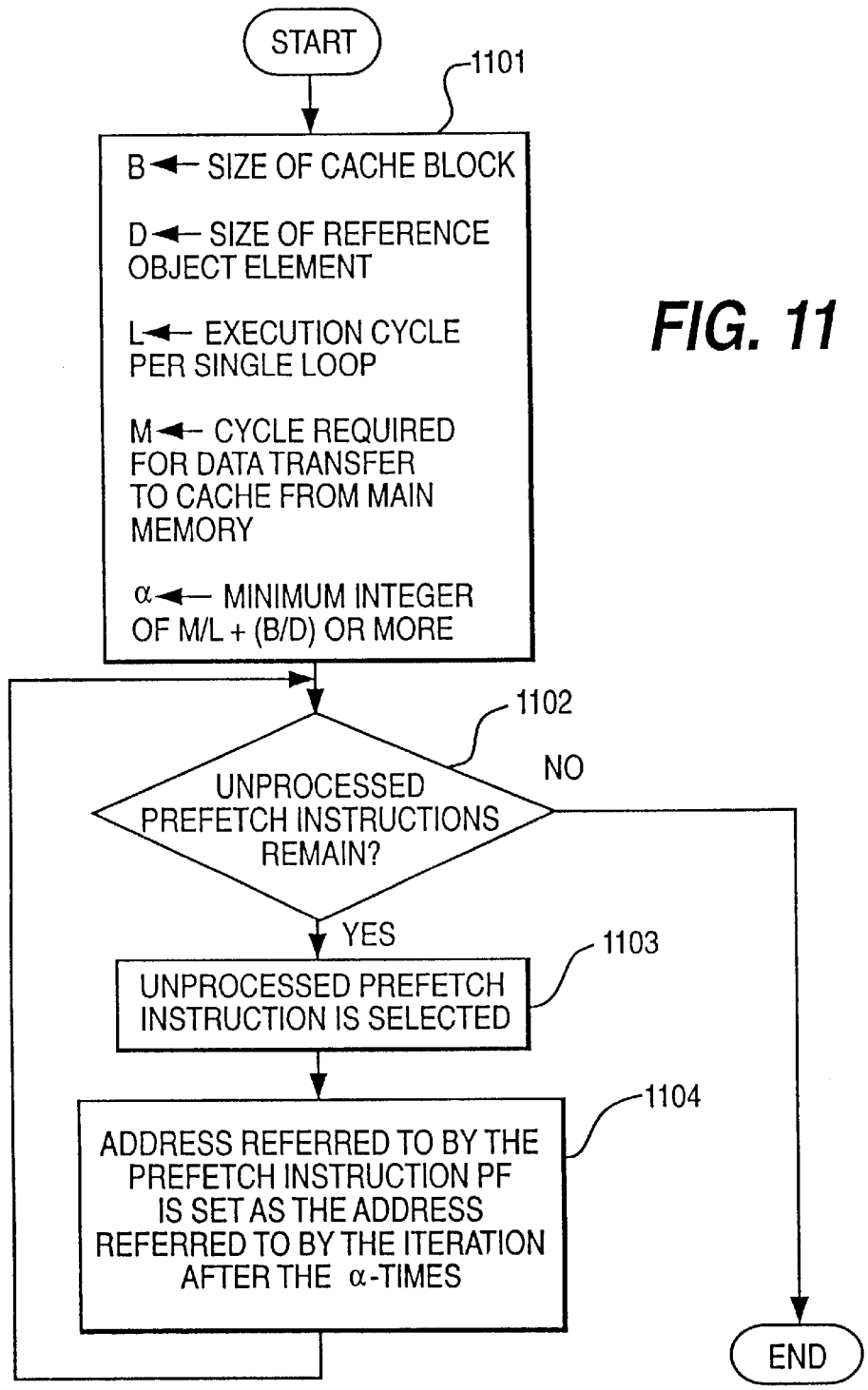

t0 = X[i]  ⟵ 1301
t1 = A*t0
t2 = Y[i]  ⟵ 1302
t3 = t1 + t2
X[i] = t3
⟵ 1303 fetch X[i]  ⟵ 1401
fetch Y[i]
t0 = X[i]  ⟵ 1402
t1 = A * t0
t2 = Y[i]
t3 = t1 + t2
X[i] = t3

METHOD FOR COMPILING LOOPS CONTAINING PREFETCH INSTRUCTIONS THAT REPLACES ONE OR MORE ACTUAL PREFETCHES WITH ONE VIRTUAL PREFETCH PRIOR TO LOOP SCHEDULING AND UNROLLING

FIELD OF THE INVENTION

The present invention relates to a data prefetch method and more specifically to a compile method which shortens the execution time of a program by prefetching data through scheduling of the prefetch instruction for a loop.

BACKGROUND OF THE INVENTION

The executing time of a program depends significantly on the waiting time generated by the dependent relationship between instructions and the waiting time generated by memory references.

The waiting time generated by the dependent relationship between instructions within a loop can be considerably reduced by using a software pipelining scheduling method. Software pipelining as described, for example, in "Software Pipelining in PA-RISC Compiler" by S. Ramakrishnan, Hewlett-Packard Journal, pp. 39–45, 1992, reduces the waiting time generated by the dependent relationship between instructions and enhances the degree of parallelism in execution of instructions by overlapped execution of different iterations of the loop. The loop to which the software pipelining is applied is characterized by executing the code for initialization called a prologue before starting execution of the loop, executing the loop body by repeating code called a kernel, terminating the process by executing code called an epilogue when execution of the loop is completed, and starting execution of the subsequent iteration without waiting for the completion of the preceding iteration.

It is rather difficult, in comparison with the waiting time generated by the dependent relationship between instructions, to reduce the waiting time associated with the memory references only with a software method. Therefore, in many computer systems, a high speed and small capacity memory called a cache memory is provided between the main memory and a processor to reduce the waiting time generated by a memory reference and thereby a high speed reference can be made on the cache memory to the data referred to recently. However, even when a cache memory is used, the waiting time is inevitably generated if a cache miss occurs while there is no recycle use of data.

Therefore, as described, for example, in "Design and Evaluation of a Compiler Algorithm for Prefetching" by T. C. Mowry, et al., Proceedings of the 5th International Conference on Architectural Support for Programming Language and Operating Systems, pp. 62–73, 1992 for example, an attempt is made to reduce the waiting time generated by the memory references by utilizing an instruction for prefetching data from the main memory to the cache memory.

SUMMARY OF THE INVENTION

In the prior art, described above, software pipelining has been applied, as a method of scheduling a prefetch instruction, in such a manner that the prefetch instruction is issued before the iterations preceding a value that is a minimum integer times larger than the value obtained by dividing the delay time of the prefetch instruction with the shortest path length of the loop body. However, the details for realizing such an application in such a manner are not yet described.

It is therefore an object of the present invention to provide an effective instruction scheduling method which can reduce the waiting time generated by a memory reference and the waiting time generated by the dependent relationship between instructions (inter-instruction dependency) while a program is executed in the loop including the prefetch instruction.

In view of achieving the objects of the method of the present invention, the scheduling of the prefetch instruction for the loop in a program is executed in accordance with one of three types of methods at the time of compiling the program.

The value of the data is not altered during the prefetch of data to the cache. Therefore, depending on the ordinary relationship between the definition and the use of the data, a dependency relationship does not exist between the prefetch of data to the cache and reference to the memory with a load instruction or store instruction. However, it is convenient and advantageous, because the existing scheduling system can be applied directly, for hiding the waiting time due to the reference to memory, when a tacit dependent relationship is assumed to exist between the prefetch instruction and the instruction for making reference to the memory due to the limitation that the memory reference instruction must be issued after completion of the data transfer to the cache by the prefetch instruction. Therefore, in method 1, the scheduling is performed by providing the dependent relationship between the prefetch instruction and the memory reference instruction.

Method 1

(1) The prefetch instruction is respectively issued for memory reference instructions which are assumed to generate a cache miss.

(2) A dependency graph having edges between the prefetch instructions generated in item (1) explained above and the corresponding memory reference instructions is generated. In this case, a delay between the prefetch instruction and the memory reference instruction is set to a value larger than the number of cycles required for data transfer to the cache by the prefetch instruction so that the memory reference instruction is issued after the number of cycles required for data transfer to the cache by the prefetch instruction.

(3) An instruction schedule is obtained by applying the software pipelining to the dependency graph generated in item (2) explained above. As explained above, software pipelining is a method that reduces the waiting time generated by the inter-instruction dependency between instructions by the overlapping execution of different iterations of the loop so that a sufficient interval can be provided between the prefetch instruction and the corresponding memory reference instruction. Thus, the scheduling is obtained by applying the software pipelining to the dependency graph generated in the item (2).

While data transfer to the cache from the main memory is generally carried out in units of 32 bytes or 128 bytes, etc., the reference to the array in the loop is often carried out in smaller units, such as 4 bytes or 8 bytes, etc. Therefore, when a memory reference is continuously carried out for the array, etc. in the loop, the data for reference can often be moved to the cache from the main memory with a plurality of repetitive executions of a prefetch instruction. That is, if it is possible to move, to the cache from the main memory, the data for reference with N times of repetitive execution of a prefetch instruction, it is enough that the prefetch instruction is generated once for every N times of execution.

For the schedule generated in method 1, since the prefetch instruction is generated once for every iteration, many redundant prefetch instructions are generated. Therefore, the prefetch instructions are scheduled by unrolling the loop so that the redundant prefetch instructions are not generated frequently.

In a method (2), the kernel section of the loop including the software pipelined prefetch instructions generated by the processings up to the item (3) from item (1) is unrolled unrolled to avoid issuing useless prefetch instructions by eliminating the redundant prefetch instructions.

Method 2

(4) Since it is sufficient to issue a prefetch instruction once for every iteration of N times when the number of data prefetched by the one prefetch instruction, the kernel section of the software pipelined schedule (item (3) explained above) is unrolled until the number of unrollings becomes a multiple of N.

(5) In the unrolled code of the item (4) explained above, the kernel section is unrolled for the number of times which is equal to a multiple of N and the iteration is executed for the number of times of a multiple of N of the loop with only one iteration of the kernel section unrolled. Therefore, issuing useless prefetch instructions can be eliminated by deleting the redundant prefetch instructions from the unrolled code so that the prefetch instruction is issued only once for an iteration of N times.

In method 2, since the redundant prefetch instructions are removed after the software pipelining is applied to the prefetch instruction, the interval between the instructions becomes shorter than that expected when the software pipelining is applied by deleting the prefetch instruction and thereby the waiting time caused by the inter-instruction dependency may become visible.

In a method 3, a plurality of prefetch instructions are replaced with one virtual prefetch instruction to generate a dependency graph including such a virtual prefetch instruction considering the unrolling of the kernel section after application of software pipeling to the loop. However, unlike methods 1 and 2, the dependent relationship may not be provided in method 3 between the virtual prefetch instruction and the corresponding memory reference instruction.

Next, software pipelining is applied to a dependency graph to obtain a software pipelined schedule and the loop is unrolled, as required, so that the number of times of unrolling of the kernel section becomes equal to a multiple of the number of data which can be prefetched by one prefetch instruction. The unrolled virtual prefetch instruction is replaced with the initial prefetch instruction to adjust an address referred to by the prefetch instruction so that the prefetch instructions are issued in an iteration sufficiently preceding the corresponding memory reference instruction.

Thereby, the dependent relationship between instructions generated by deleting the instruction in method 2 can be reduced.

Method 3

In accordance with method 3 of the present invention, the following steps are executed.

(1) The prefetch instructions are generated respectively for the memory reference instructions which are assumed to generate a cache miss.

(2) The prefetch instructions generated in item (1) explained above are grouped into a plurality of groups and are then replaced with virtual prefetch instructions.

(3) A dependency graph composed of an instruction of an original loop body and virtual prefetch instructions generated in item (2) above is generated and the software pipelining is applied thereto. In the case of generating the dependency graph, it is no longer necessary to think about the dependent relationship between the virtual prefetch instruction and the corresponding memory reference instruction.

(4) The loop is unrolled as required so that the number of times of unrolling of the kernel section formed in the item (3) explained above becomes equal to a multiple of the number of times of iteration for prefetching data with one prefetch instruction. In the schedule after the unrolling, the virtual prefetch instruction indicates instruction slots, in any one of which the original prefetch instruction is inserted.

(5) The virtual prefetch instruction scheduled in the unrolled code of item (4) above is replaced with the original prefetch instruction. This replacement is necessary to issue the same prefetch instruction for every multiple of the number of iterations for prefetching the data with one prefetch instruction. Thereby, issuing redundant prefetch instructions can be controlled.

(6) An address used for reference by the prefetch instruction replaced in the item (5) explained above is used as the address of the data referred to subsequently in the completion of the data transfer by means of the prefetch instruction.

According to the method of the present invention, if reference to memory is not continuously executed, an interval between the prefetch instruction and a memory reference instruction can be maintained sufficiently long by method 1 in view of applying the software pipelining. Moreover, when the memory reference is executed continuously, issuing redundant prefetch instructions can be controlled to effectively perform the scheduling by removing the instruction after application of the software pipelining by means of method 2 or by applying the software pipelining through replacement of a plurality of prefetch instructions with the virtual prefetch instruction by means of method 3 and then recovering the virtual prefetch instruction into the original prefetch instruction. Thereby, the object of the present invention can be achieved.

BRIEF DESCRIPTION OF THE DRAWINGS

FIG. 11 is a flowchart of a prefetch address adjusting section.

FIG. 12 is an example of a FORTRAN source program.

DETAILED DESCRIPTION OF THE PREFERRED EMBODIMENTS

A preferred embodiment of the present invention will be explained with reference to the accompanying drawings.

Figure 2:
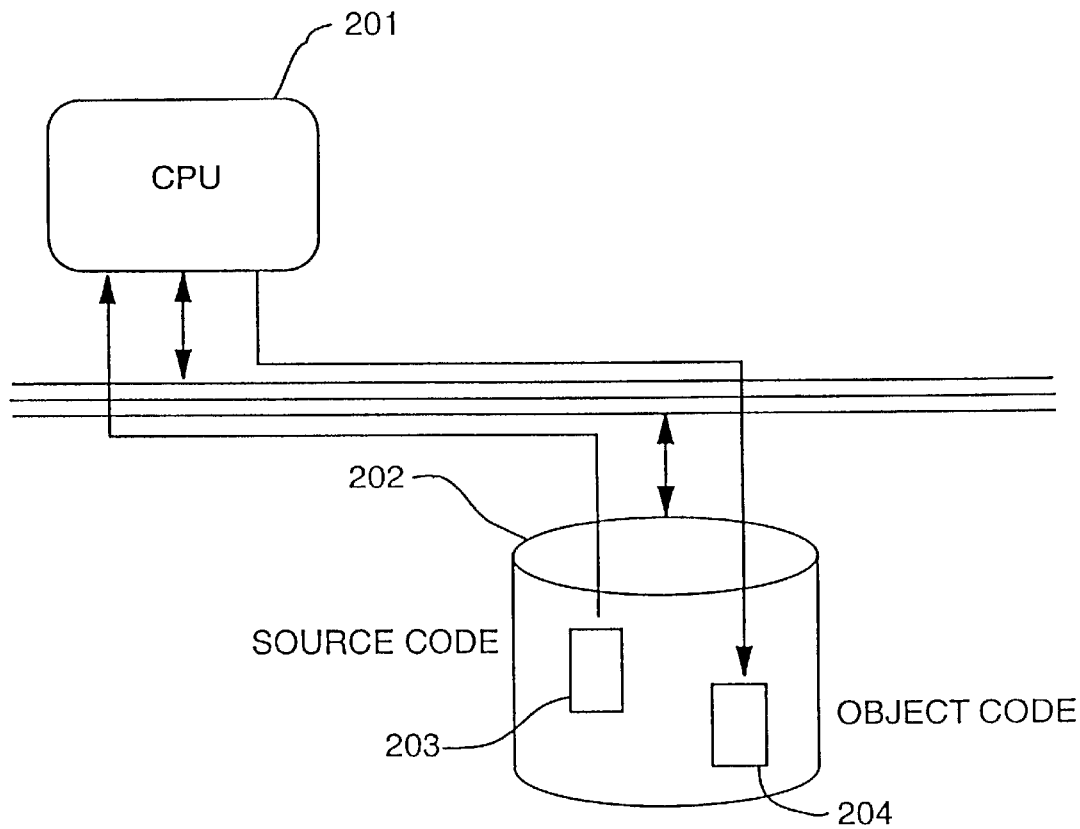
FIG. 2 is an example of a computer system in which the present invention is employed.

FIG. 2 illustrates an example of a computer to which the method of the present invention is applied. In this example, a compiler, which in a preferred embodiment is constituted by a combination of software stored on a storage medium 202, such as a hard disk or other storage device, and hardware, such as a computer (CPU) 201 that executes the software to perform the function of the compiler, operates on the CPU 201 and reads the source code 203 from an external memory 202, converts it into the object code 204 and then stores the object code into the external memory 202.

Figure 3:
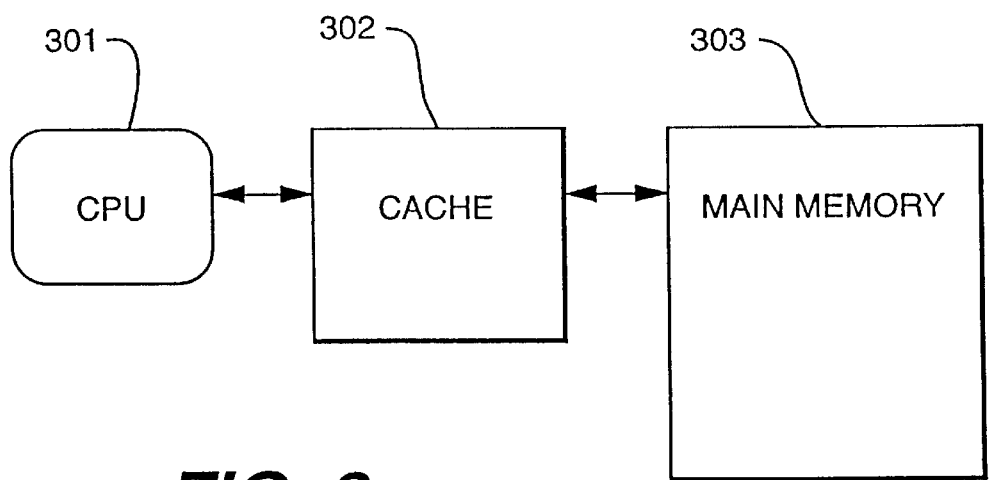
FIG. 3 is an example of a computer in which the present invention is employed.

FIG. 3 illustrates an example of a computer in which the data prefetch method of the present invention is employed. In the case of executing an ordinary memory reference instruction with the CPU 301, it is first checked whether the reference object data is in the cache 302. When such data exists in the cache 302, reference is made to such data. If there is no such data as the reference object, reference is made to the relevant data in the main memory 303 and a cache block to which the relevant data belongs is placed in the cache 302. Reference to the cache is made at a high speed in comparison with the reference to the main memory and when the data as the reference object is found to be in the cache, the waiting time generated by the memory reference is reduced.

The prefetch instruction is used for moving the cache block that the data of the reference object belongs to into the cache 302 from the main memory 303 simultaneously with the execution of the other instructions. Since the other instructions can be executed during the transfer of the data to the cache 302 from the main memory 303 by issuing the prefetch instruction beforehand by a number of cycles sufficient for movement of the cache block to the cache 302 from the main memory 303, the waiting time for making reference to the relevant data can be eliminated.

Figure 1:
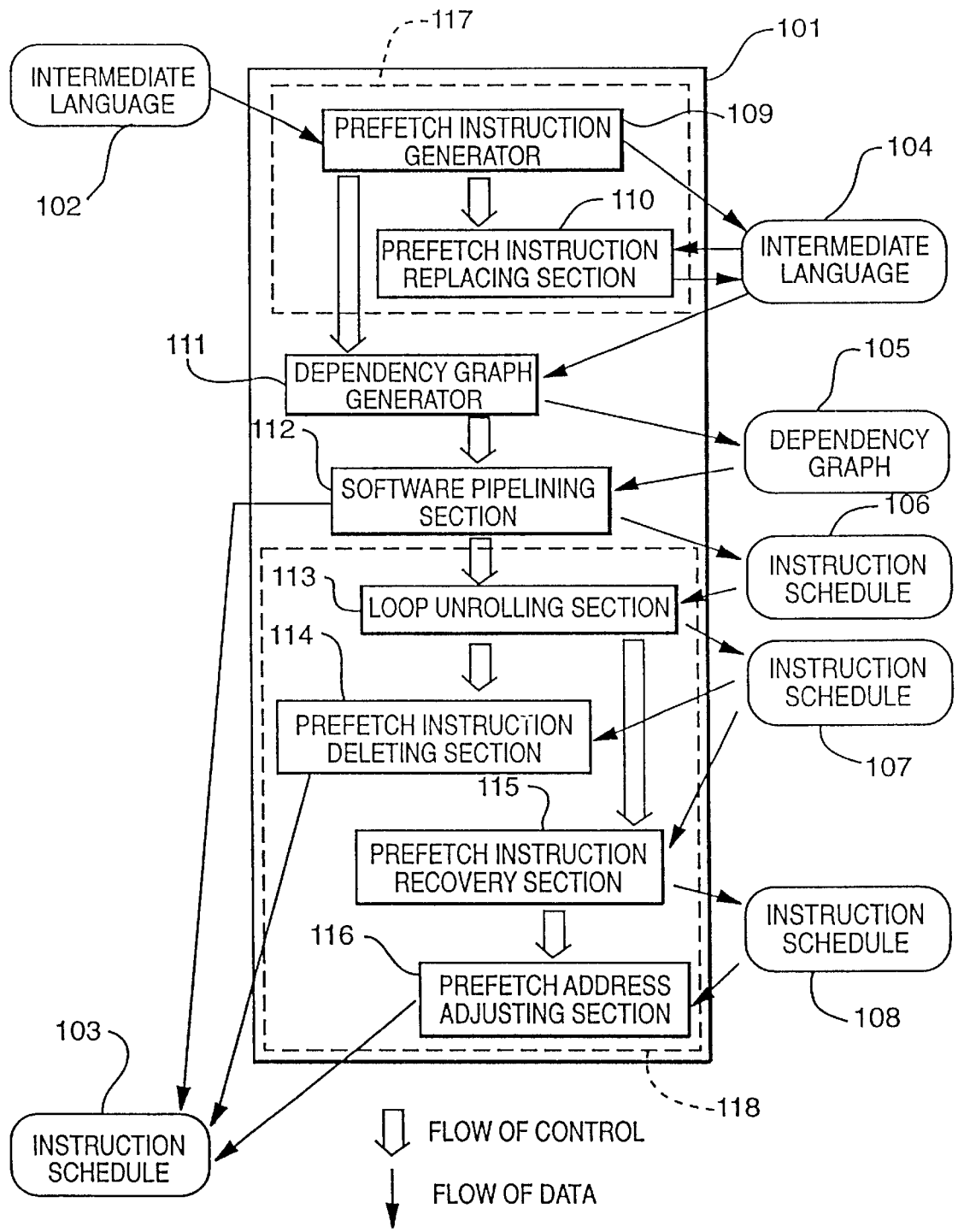
FIG. 1 is a diagram of an instruction scheduler for scheduling the prefetch instructions.

FIG. 1 illustrates a diagram providing an example of the present invention. In FIG. 1, a scheduling processor 101 inputs an intermediate language 102 for a loop body and outputs an instruction schedule 103 including the prefetch instructions and having a reduced amount of delay caused by inter-instruction dependency and a reduced amount of waiting time resulting from memory reference. Processings 117 and 118 (software program processings) are characteristic processings of the present invention. In the processing 117, the generation of prefetch instructions and the preprocessing of the scheduling are executed, while in the processing 118, the removal of redundant prefetch instructions and postprocessing, such as adjustment of prefetch addresses, are performed.

Figure 4:
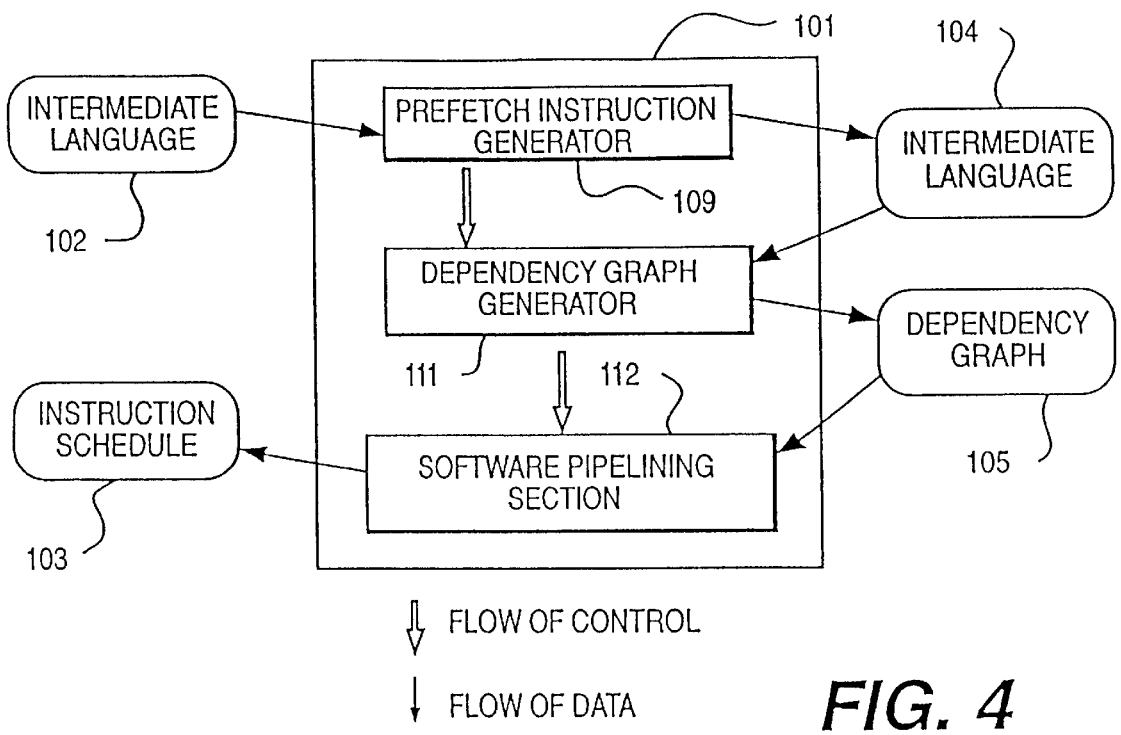
FIG. 4 is a diagram of an instruction scheduler that executes scheduling according to method 1.

First, an embodiment for scheduling the loop with method 1 will be described. FIG. 4 is a diagram of an instruction scheduler for scheduling the prefetch instruction with method 1. In method 1, the prefetch instruction generator 109 inputs an intermediate language 102 to provide the intermediate language 104 having the added prefetch instructions by generating the prefetch instructions for the memory reference instructions which are assumed to have a high possibility for generating a cache miss among those included in the intermediate language 102 included in the loop body.

Here, the possibility for generating a cache miss of a certain memory reference instruction can be estimated according to the known prior art described in "Design and Evaluation of a Compiler Algorithm for Prefetching" by T. C. Mowry et al., Proceedings of the 5th International Conference on Architectural Support for Programming Language and Operating Systems, pp. 62–73, 1992, for example, along with a trace of the program execution. The addresses prefetched by the prefetch instructions generated are assumed to be those of the corresponding memory reference instructions.

Namely, if a load instruction, LOAD X[i], in the loop is assumed to easily generate a cache miss, an instruction for prefetching the same element, FETCH X[i], is generated and it is then added to the intermediate language.

Next, the dependent graph generator 111 inputs the intermediate language 104 including the prefetch instruction to generate a dependency graph 105. In this case, an edge indicating that a delay required between the prefetch instruction and the corresponding memory reference instruction is longer than the time required for transferring the cache block to the cache from the main memory is provided between the prefetch instruction and the corresponding memory reference instruction. Next, the software pipelining is applied to the dependency graph 105 in the software pipelining section 112 to obtain the software pipelined instruction schedule 103.

As explained above, since it is guaranteed that an interval between the prefetch instruction and the corresponding memory reference instruction is set to the time required for transfer of a cache block to the cache from the main memory at the time of application of the software pipelining by generating the dependency graph having an edge between the prefetch instruction and the corresponding memory reference instruction to indicate that the necessary delay is longer than the time required for transfer of the cache block to the cache from the main memory, the prefetch instruction can be scheduled to hide the latency due to the memory reference.

Figure 7:
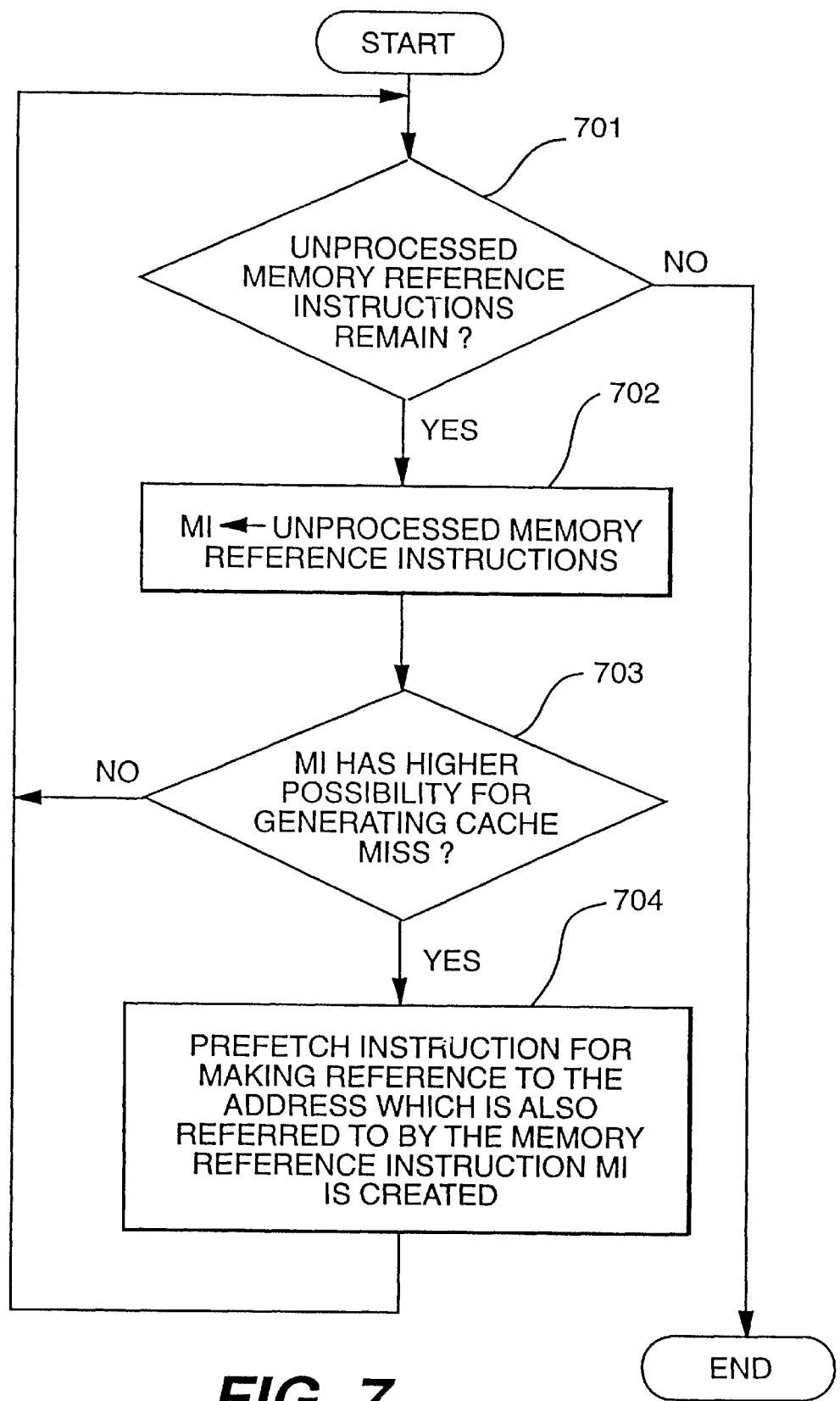
FIG. 7 is a flowchart of a prefetch instruction generator.

The prefetch instruction generator 109 explained above will be further explained with reference to an operation flowchart shown in FIG. 7. First, in step 701, whether any memory reference instructions to be processed remain or not is judged. When such instruction is left, control skips to step 702. When there is no such instruction, processing is completed. In step 702, the memory reference instruction to be processed is selected and is then stored in a variable MI. In step 703, whether the memory reference instruction stored in MI has a high possibility for generating a cache miss or not is judged. When such possibility for generating a cache miss is high, the control skips to step 704. When such possibility is low, control skips to step 701 to process the next memory reference instruction. In step 704, the prefetch instruction for making reference to the address that is the same as that of the memory reference instruction is stored in MI is generated.

Next, an embodiment for scheduling the loop by method 2 will be explained. In method 2, the following processings are also executed in addition to the processings of method 1. First, the kernel section of software pipelined instruction schedule 106 obtained by the processing of method 1 is unrolled for a plurality times in the loop unrolling section 113 to obtain the instruction schedule 107. The number of times of development is set, for example, to be the least common multiple of B/D and N, when a size of a cache block which can be moved to the cache from the main memory by execution of the one prefetch instruction is defined as B, a size of the element referred by the memory reference instruction as D and an increment of the array reference element as N.

When a loop is unrolled, the redundant prefetch instructions are deleted subsequently from the instruction schedule 107 obtained by unrolling of the loop by the prefetch instruction deleting section 114. Thereby, the final instruction schedule 103 not including the redundant prefetch instruction can be obtained. In regard to the deletion of the redundant prefetch instructions, since it is enough that the prefetch instruction is once issued for every B/D times, the other instructions are deleted so that the prefetch instruction is issued once every B/D times for each unrolled prefetch instruction.

In the method explained above, the number of times of loop unrolling is increased in some cases. Therefore, when it is required to keep low the number of times of the loop unrolling, for example, the loop is unrolled for an adequate number of times and the other instructions are deleted so that the prefetch instruction is generated in every other iteration of the B/D times. Thereby, a few redundant prefetch instructions may be issued, but an increase in the number of times of unrolling can be prevented.

Figure 8:
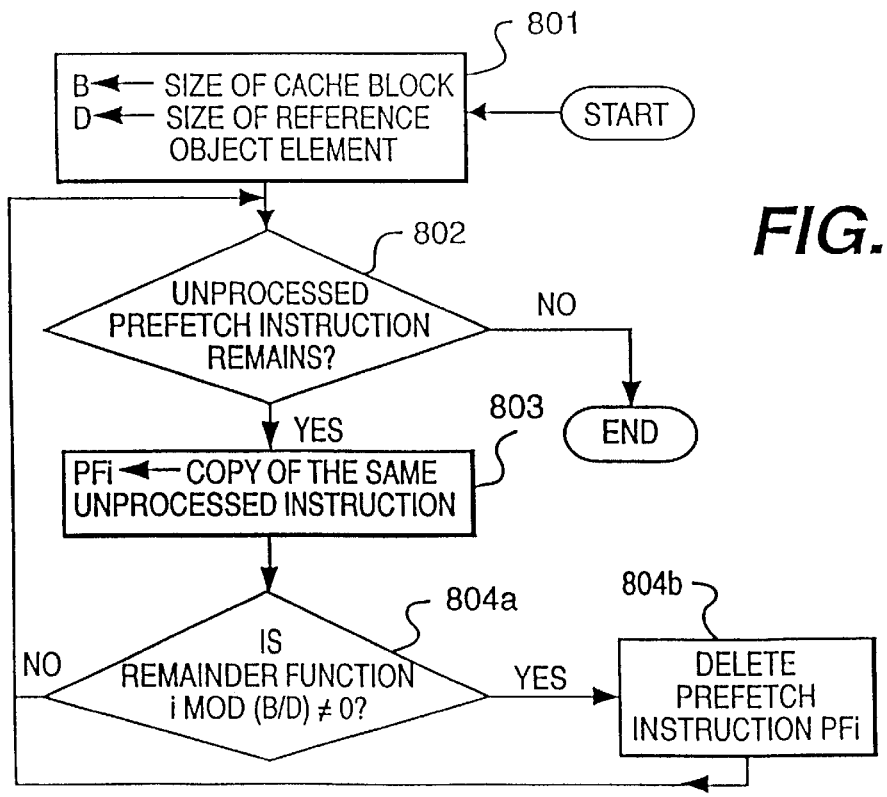
FIG. 8 is a flowchart of a prefetch instruction deleting section.
Figure 5:
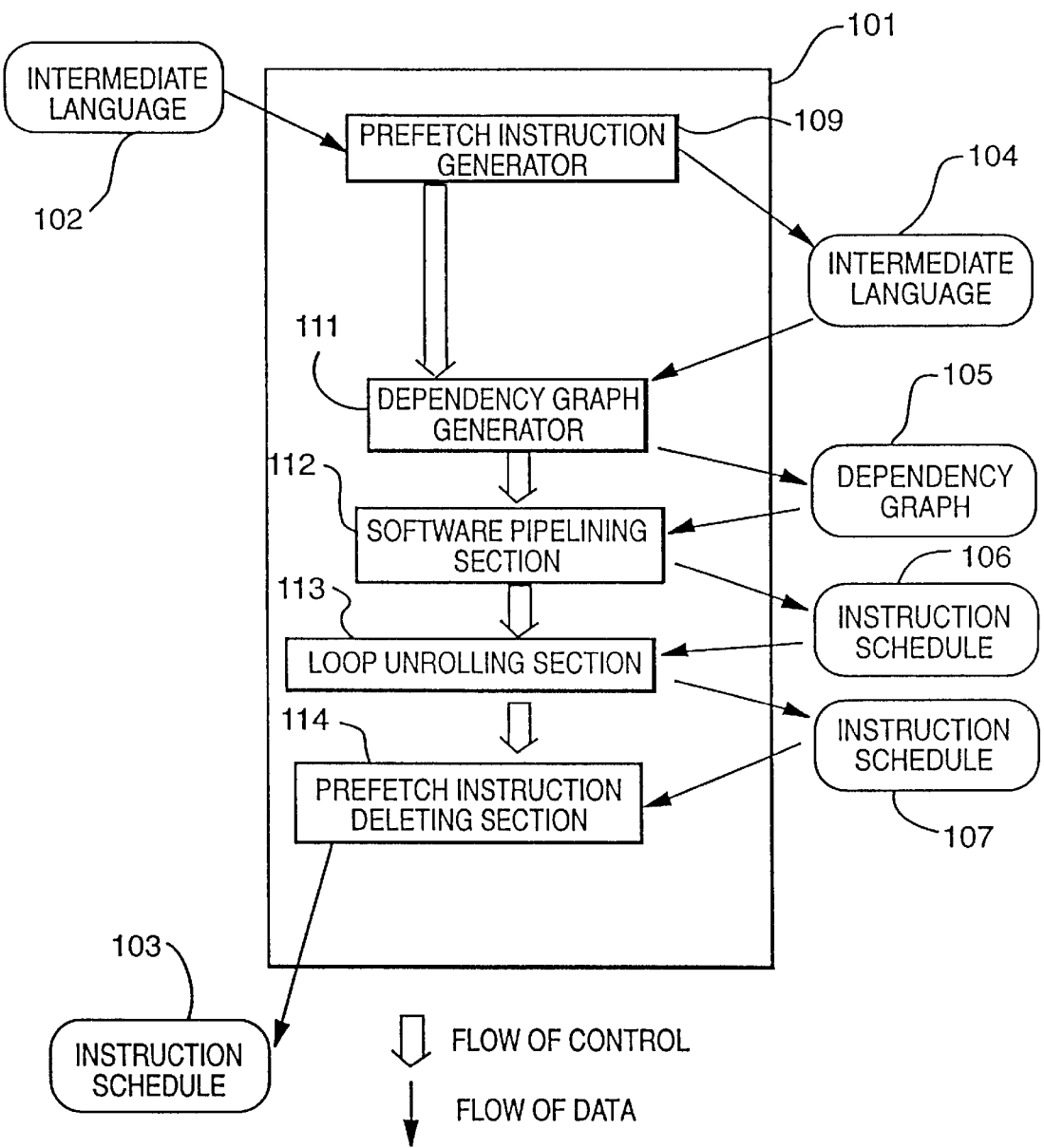
FIG. 5 is a diagram of an instruction scheduler that executes scheduling according to method 2.
Figure 6:
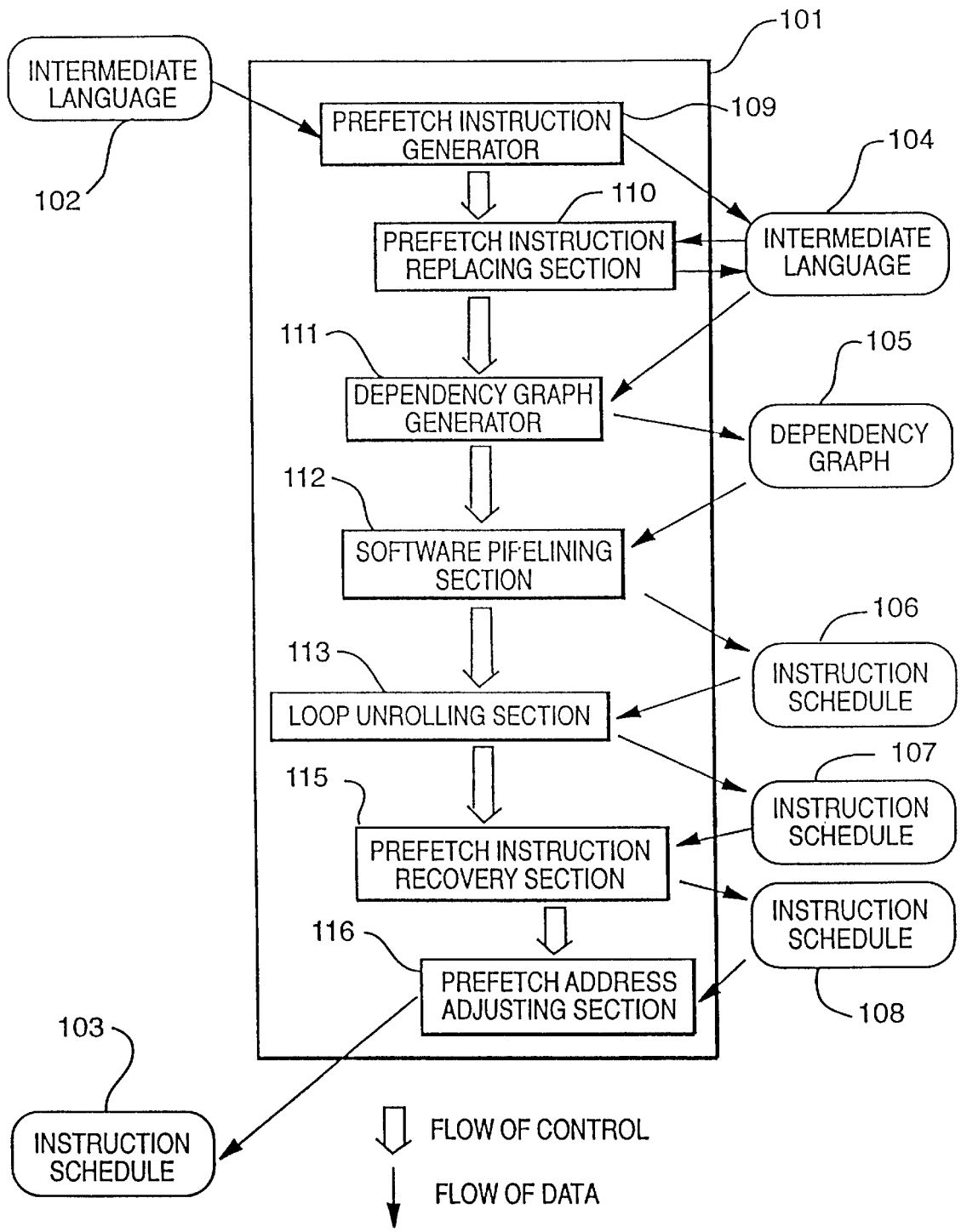
FIG. 6 is a diagram of an instruction scheduler that executes scheduling according to method 3.

Operations of the prefetch instruction deleting section 114 in the above explanation will now be explained with reference to the flowchart shown in FIG. 8. First, in step 801, a size of the cache block is set to a constant B, while a size of the reference object element as a constant D. In step 802, whether unprocessed prefetch instructions remain or not is judged. When these instructions exist, the control is shifted to step 803 and when there is no such instructions, the processing is completed. In step 803, the same unprocessed prefetch instructions are copied by the loop unrolling section 113 in FIG. 1 and are sequentially assigned to variables PFi ($0 \leq i \leq n$). In step 804a, if there exists a remainder: where i is divided by (B/D) (i mod (B/D))≈0) for $0 \leq i \leq n$, namely if i is not an integer multiple of B/D, the prefetch instruction PFi is deleted in step 804b and the control is shifted to step 802 to process the next prefetch instruction. Thereby, the prefetch instruction is issued once for every other iteration of multiples of B/D. The "MOD" function is recognized in PASCAL computer programming language to be the function that computes the remainder of division.

Next, an embodiment of scheduling the loop by method 3 will be explained. First, a prefetch instruction for the memory reference instruction having a high possibility for generating a cache miss is generated from the intermediate language 102 as an input in the prefetch instruction generator 109 as in the case of method 1 to obtain the intermediate language 104 having the added prefetch instruction.

Next, a plurality of prefetch instructions generated by the prefetch instruction generator 109 are formed into groups and such groups are replaced with virtual prefetch instructions in the prefetch instruction replacing section 110. In this replacement, for example, the virtual prefetch instructions for such a minimum integer number as is larger than M/(B/D) is generated when a size of a cache block which can be moved to the cache from the main memory by execution of one prefetch instruction is defined as B, a size of the element referred with the memory reference instruction as D and the number of prefetch instructions included in the intermediate language 104 as M and the prefetch instruction generated once for every other instruction of B/D number corresponds to one virtual prefetch instruction. When the virtual prefetch instruction is generated, the original prefetch instruction in the intermediate language 104 is deleted and a newly generated virtual prefetch instruction is added.

Next, the dependency graph generator 111 generates a dependency graph 105 from an input of the intermediate language 104. In this case, unlike methods 1 and 2, there is not any dependent relationship between the virtual prefetch instruction and memory reference instruction. Subsequently, the software-pipelined instruction schedule 106 is obtained by applying the software pipelining to the loop in the software pipelining section 112. Since the dependent relationship is not provided in method 3, unlike methods 1 and 2, between the prefetch instruction and corresponding memory reference instruction, a high degree of freedom for instruction array can be assured for application of the software pipelining.

Next, the software-pipelined instruction schedule 106 is unrolled for several times in the loop unrolling section 113 to obtain an instruction schedule 107. The number of times of unrolling is set to the least common multiple, for example, of B/D and N, as in the case of method 2, when a size of the cache block which can be moved to the cache from the main memory by execution of one prefetch instruction is defined as B, a size of the element referred by the memory reference instruction as D and an increment of the array reference element as N. When the loop unrolling processing by the loop unrolling section 113 is completed, the virtual prefetch instruction included on the obtained instruction schedule 107 is recovered, in the prefetch instruction recovery section 115, to the corresponding prefetch instruction replaced in the prefetch instruction replacing section 110. To a certain virtual prefetch instruction VP, n prefetch instructions PF1, PF2, . . . ,PFn correspond, and when it is assumed that the virtual prefetch instruction VP is unrolled into m virtual prefetch instructions VP1, VP2, . . . ,VPm by the loop unrolling section 113, such recovery processing is performed, for example, as explained hereunder.

In the case where n=B/D, when j=i mod(B/D), VPi is replaced with PFj.

In the case where n<B/D, when j=i mod(B/D), VPi is replaced with PFj, if $1 \leq j \leq n$, and VPi is deleted if n<j.

As a result, an instruction schedule 108 consisting of the original prefetch instruction can be obtained.

Next, an instruction schedule 103 not including redundant prefetch instructions can be obtained by adjusting the reference object address of the prefetch instruction of the instruction schedule 108 so that the data is prefetched, in the prefetch address adjusting section 116, with the iteration which occurs sufficiently later for completion of data transfer by the prefetch instruction.

This address adjustment is performed as explained hereunder when the prefetch instruction, FETCH X[i], is issued, for example, for the array X.

That is, it is enough when the array element, which is referred to with the iteration for the number of times of a minimum integer which is equal to or larger than M/L+(B/D), where the number of cycles required for a single execution of the scheduled loop is defined as L and the number of cycles required for transfer of a cache block of the object data to the cache from the main memory with the prefetch instruction as M, is prefetched.

That is, when the number of times of iteration is defined as a, it is enough to adjust the reference address of the above prefetch instruction to FETCH X[i+$\alpha$].

Hereafter, the processings executed by the prefetch instruction replacing section 110 and prefetch instruction recovery section 115 in method 3 will then be explained with reference to the flowchart.

Figure 9:
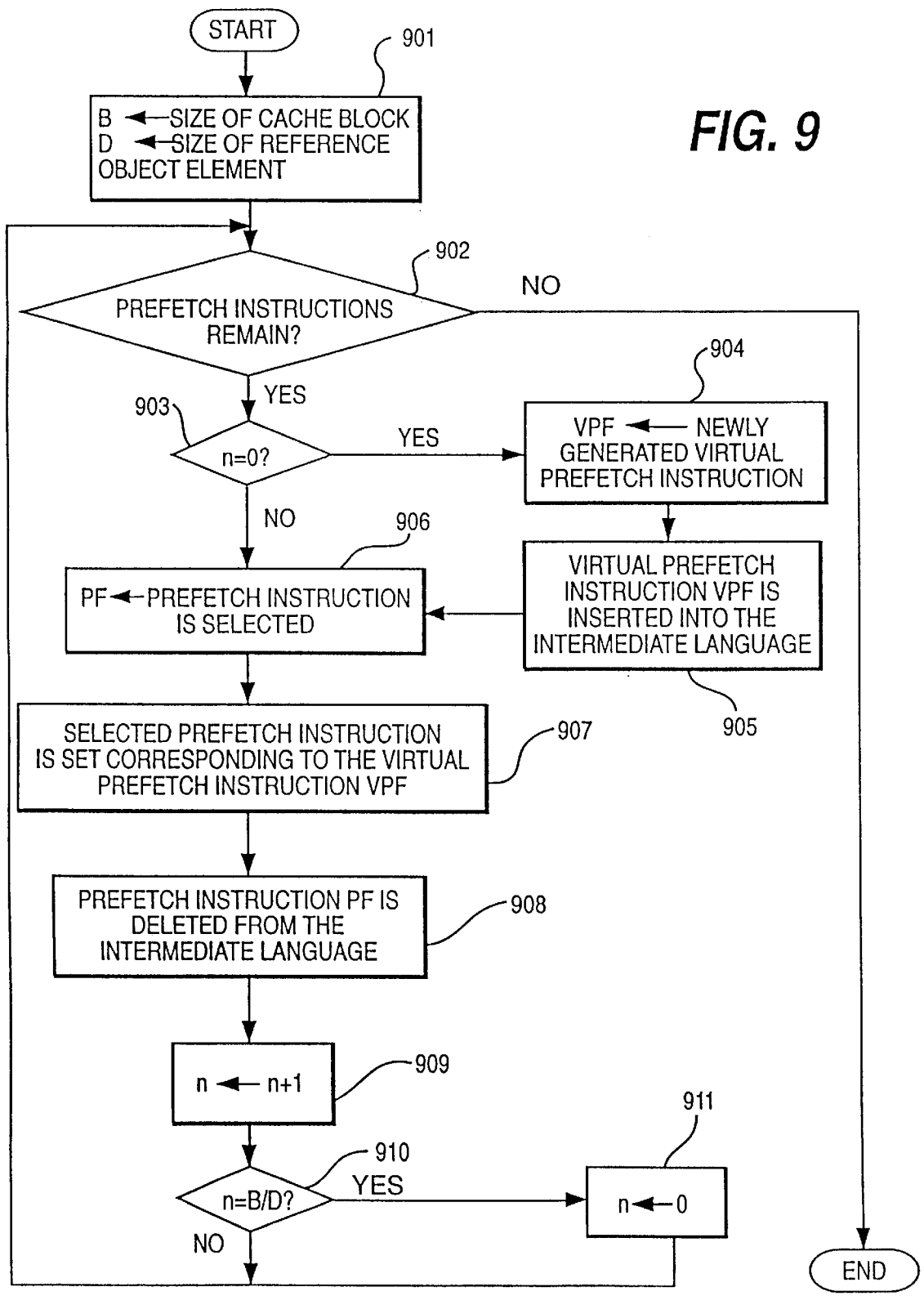
FIG. 9 is a flowchart of a prefetch instruction replacing section.

FIG. 9 is an operation flowchart of the prefetch instruction replacing section 110 in FIG. 1. First, in step 901, a size of a cache block is set to a constant B, a size of the reference object element to a constant D and a value of variable n for recording the number of prefetch instructions to 0. In step 902, it is determined whether or not any prefetch instructions still remain. When these instructions remain, the control skips to step 903. When there is no such instruction, the processing is completed. In step 903, whether a value of the variable n is 0 or not is judged. When the result is YES, the control skips to step 904. If the result is NO, the control skips to step 906. In step 904, a new virtual prefetch instruction is generated and it is then stored in the variable VPF. In step 905, the virtual prefetch instruction stored in the variable VPF is inserted into the intermediate language stream.

In step 906, the prefetch instruction is selected and stored in the variable PF. In step 907, the prefetch instruction recorded in the variable PF is provided to correspond to the virtual prefetch instruction recorded in the variable VPF. In step 908, the prefetch instruction recorded in the variable PF is deleted from the intermediate language stream. In step 909, the variable n shows an increment of 1 (one). In step 910, whether the value of n is equal to (B/D) or not is judged. When the result is YES, the control skips to step 911. When the result is NO, the control skips to step 902 to process the next prefetch instruction. In step 911, the control skips to step 902 to process the next prefetch instruction. Thereby, the prefetch instruction is replaced once with the virtual prefetch instruction for every other (B/D) prefetches.

Figure 10:
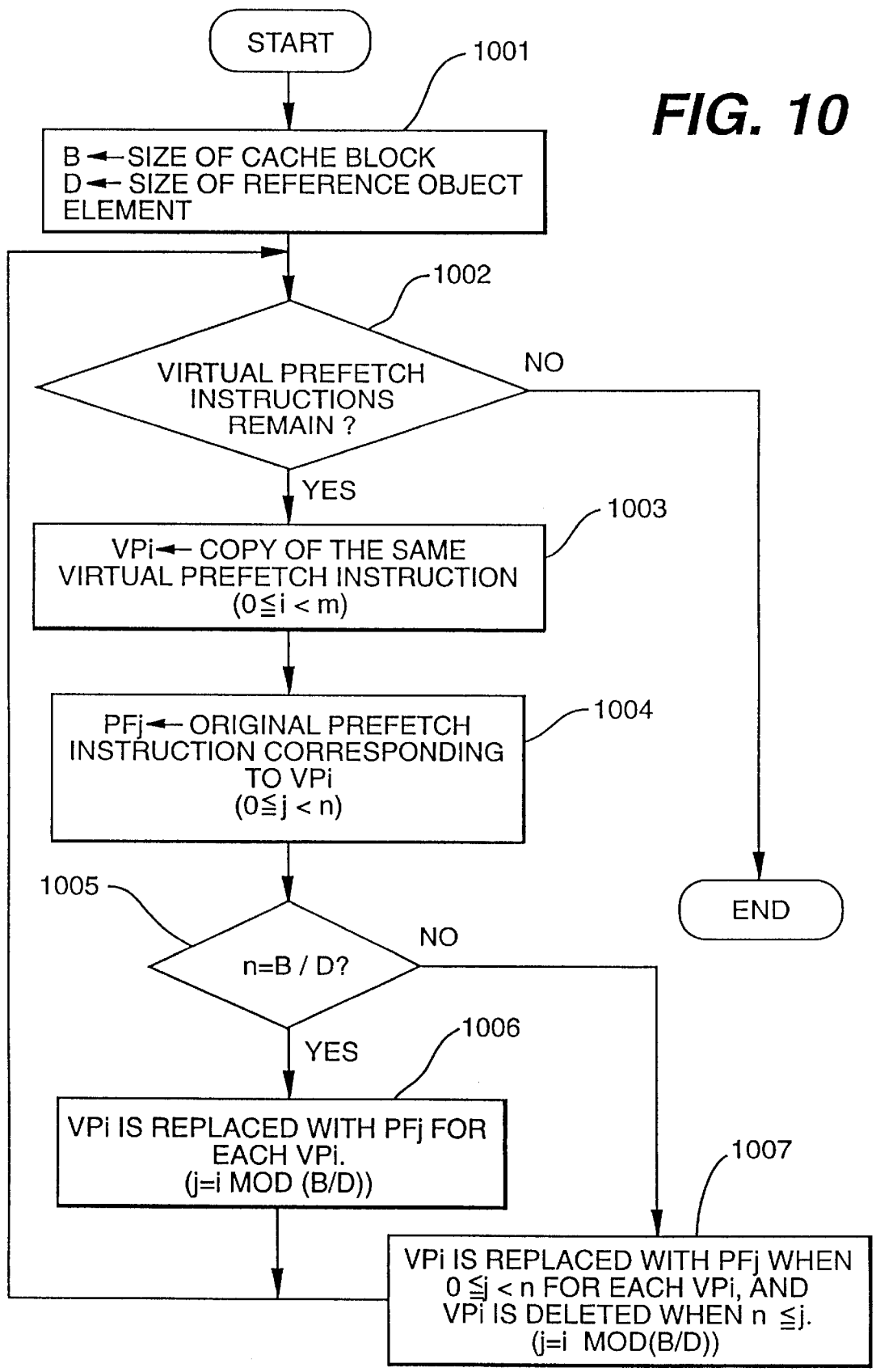
FIG. 10 is a flowchart of a prefetch instruction recovery section.

FIG. 10 is an operation flowchart of the prefetch instruction recovery section 115 in FIG. 1. First, in step 1001, a size of the cache block is set to a constant B and a size of the reference object element as a constant D. In step 1002, it is determined whether or not any virtual prefetch instructions still remain. When these instructions remain, the control skips to step 1003. When there is no such instruction, the processing is completed. In step 1003, the similar virtual prefetch instructions copied by the loop unrolling section 113 in FIG. 1 are sequentially stored in the variable VPi ($0 \leq i \leq m$). In step 1004, the original prefetch instructions corresponding to VPi are stored in the variable PFj ($0 \leq j < n$).

In step 1005, whether the number n of prefetch instructions PFj is (B/D) or not is judged. When the result is YES, the control skips to step 1006 and when the result is NO, the control skips to step 1007. In step 1006, when j=i MOD(B/D) for each VPi, VPi is replaced with PFj and the control skips to step 1002 to process the next virtual prefetch instruction. In step 1007, when j=i MOD(B/D) for each VPi, VPi is replaced with PFj if $0 \leq j < n$, while VPi is deleted if $n \leq j$ and the control skips to step 1002 to process the next virtual prefetch instruction. Thereby, the virtual prefetch instruction is recovered as the original prefetch instruction and each prefetch instruction is repeated once in every other B/D instructions.

FIG. 11 is an operation flowchart of the prefetch address adjusting section 116 in FIG. 1. First, in step 1101, a size of the cache block is set to a constant B, a size of the reference object element to a constant D, the number of execution cycles per loop to L, the number of cycles required for data transfer to the cache from the main memory to M and the number of iterations a to precedently issue the prefetch instruction to the minimum integer equal to or larger than M/L+(B/D). In step 1102, it is determined whether or not any unprocessed prefetch instructions still remain. When these instructions remain, the control skips to step 1103. When none of these remain, the processing is completed. In step 1103, the unprocessed prefetches are selected and are stored in the variable PF. In step 1104, the address referred by the prefetch instruction stored in the variable PF is changed to the address referred after the iteration of $\alpha$ times. Thereby, the prefetch instruction is issued sufficiently before generation of the memory reference instruction and the waiting time due to the memory reference can be hidden.

Subsequently, the effect of the scheduling by an embodiment of each method will be explained using practical examples. FIG. 12 is an example of a loop of the FORTRAN program used for explanation about an embodiment. The intermediate language shown in FIG. 13 can be constituted from the loop body of this program. An example of the schedule of the prefetch instruction in each method when such intermediate language is used as an input is indicated hereunder.

Figures 13, 14, 15:
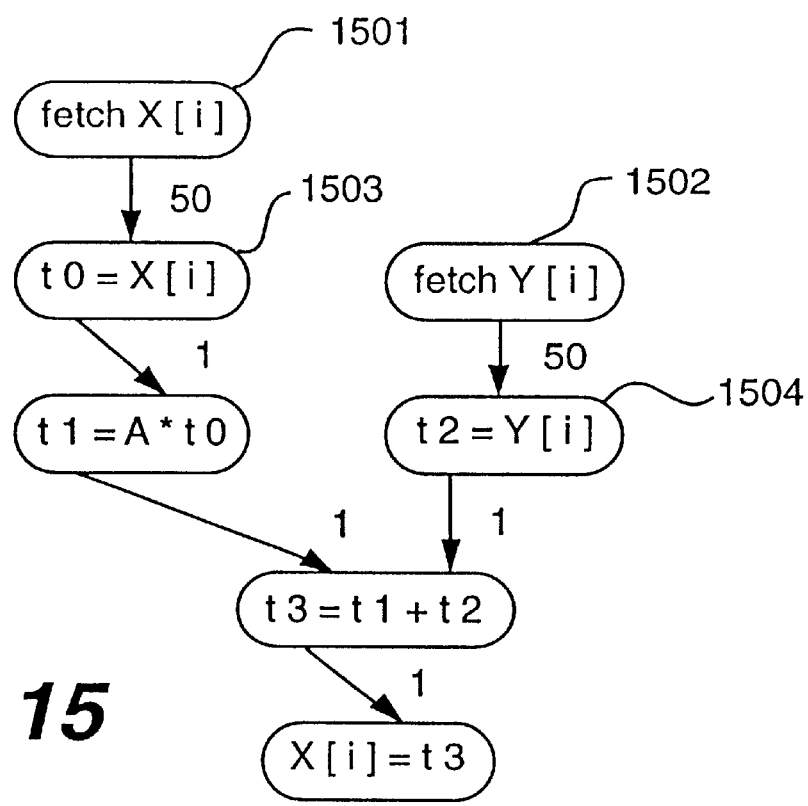
FIG. 13 is an example of the intermediate language generated in compiling the source program of FIG. 12.
FIG. 14 is an example of the intermediate language of FIG. 13 which includes the prefetch instructions.
FIG. 15 is an example of a dependency graph for the intermediate language of FIG. 14 which includes the prefetch instructions according to method 1.

In the example of FIG. 13, memory reference is performed with the instructions 1301, 1302, 1303, but since the same address is referred to by the instructions 1301 and 1303, one prefetch instruction is respectively generated for the arrays X and Y. In this example, a super-scalar type processor is assumed to execute in parallel the memory reference instruction, prefetch instruction and arithmetic instruction. However, the present invention can be applied not only to the super-scalar type processor but also to the sequential type processor and very long instruction word (VLIW) processor. In the following examples, it is assumed that the data to be used for the iteration of four times can be transferred to the cache with a single prefetch instruction and data transfer to the cache from the main memory requires 50 cycles.

Method 1

(1) Generation of the prefetch instructions

The prefetch instructions are generated for the arrays X and Y. The intermediate language having the added prefetch instructions is shown in FIG. 14. In this figure, the instructions 1401 and 1402 are respectively prefetch instructions for the arrays X and Y.

(2) Generation of dependency graph

FIG. 15 illustrates a dependency graph for an intermediate language having the added prefetch instructions. In this figure, a node indicates an instruction and an arrow between the nodes indicates the dependent relationship. A numeral added to the right side of each arrow indicates the number of cycles for separating instructions. As shown in this figure, a dependent relationship having a delay of 50 cycles required for the transfer of data to the cache from the main memory is provided between the prefetch instruction 1501 for the array X and the load instruction 1503 for the array X; and between the prefetch instruction 1502 for the array Y and the load instruction 1504 for the array Y.

(3) Software pipelining

Figure 16:
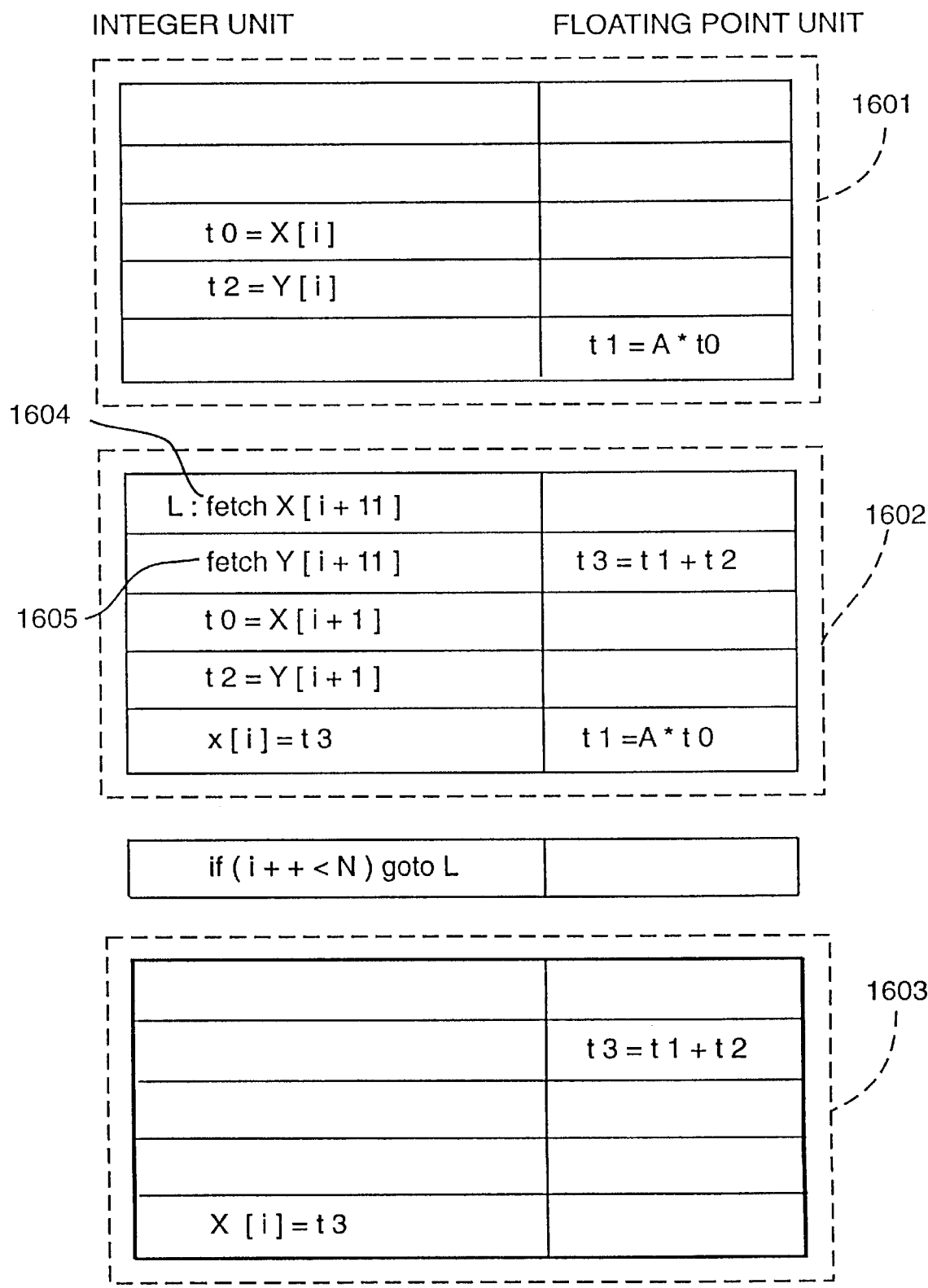
FIG. 16 is an example of the software-pipelined schedule obtained by applying software pipelining to the dependency graph of FIG. 15 according to method 1.

The software pipelining is applied to the dependency graph of FIG. 15. The software-pipelined schedule is shown in FIG. 16. The schedule shown in FIG. 16 is composed of a prologue section 1601 for initializing the loop, a kernel section 1602 for repeating the loop and an epilogue section 1603 for processing to terminate the loop. Each entry of FIG. 16 indicates the instruction slots corresponding to each entry. The prefetch instructions are assigned to the instruction slots 1604 and 1605 and are scheduled to be executed by the software pipelining in the iteration 10 times before the corresponding memory reference instruction. Since the schedule which satisfies dependent relationship between instructions has been obtained by the software pipelining, the waiting time generated by the memory reference can be eliminated.

Method 2

In the embodiment of method 1, two prefetch instructions are generated for a single iteration. Since the data used for an iteration of four times can be prefetched with the prefetch instruction, it is useless to issue the prefetch instruction for each processing. Therefore, the generation of useless prefetch instructions can be controlled, in method 2, by applying the following processing to method 1.

(4) Loop development

Figure 17:
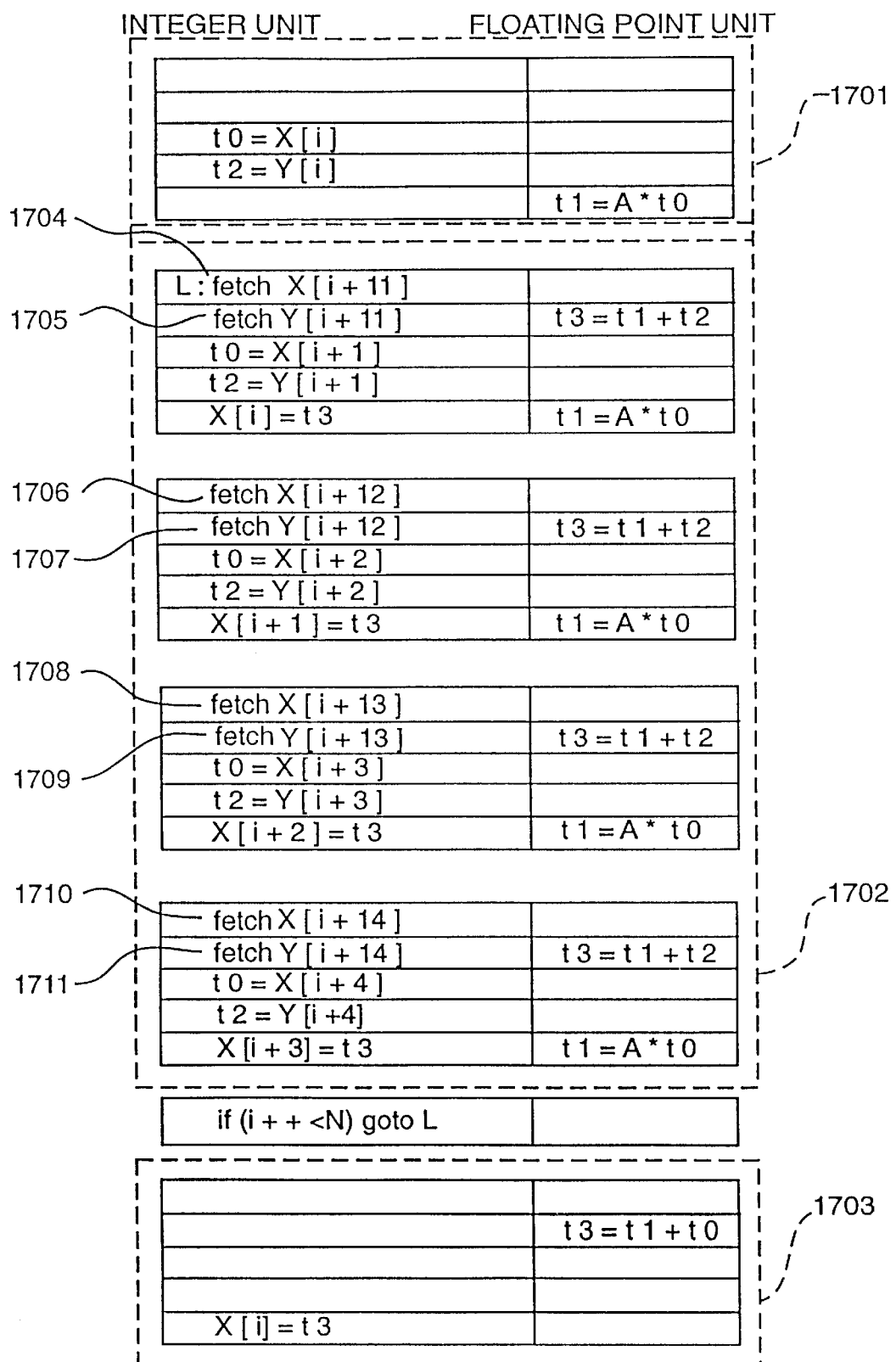
FIG. 17 is an example of the unrolled schedule obtained by method 2.

The kernel section of the software-pipelined loop constituted in item (3) of method (3) is unrolled. Since it is assumed, in this embodiment, that the data referred to by the iteration of four times can be transferred to the cache with a single prefetch operation, it is enough when the prefetch instruction is generated once for every iteration of four times. Therefore, the schedule indicated in FIG. 17 can be obtained by unrolling the kernel section four times. The schedule shown in FIG. 17 is composed of the prologue section 1701, unrolled kernel section 1702 and epilogue section 1703. The prefetch instruction for the array X in the kernel section 1702 is unrolled to the instruction slots 1704, 1706, 1708 and 1710, while the prefetch instruction for the array Y is unrolled to the instruction slots 1705, 1707, 1709 and 1711.

(5) Deletion of redundant prefetch instructions

Figure 18:
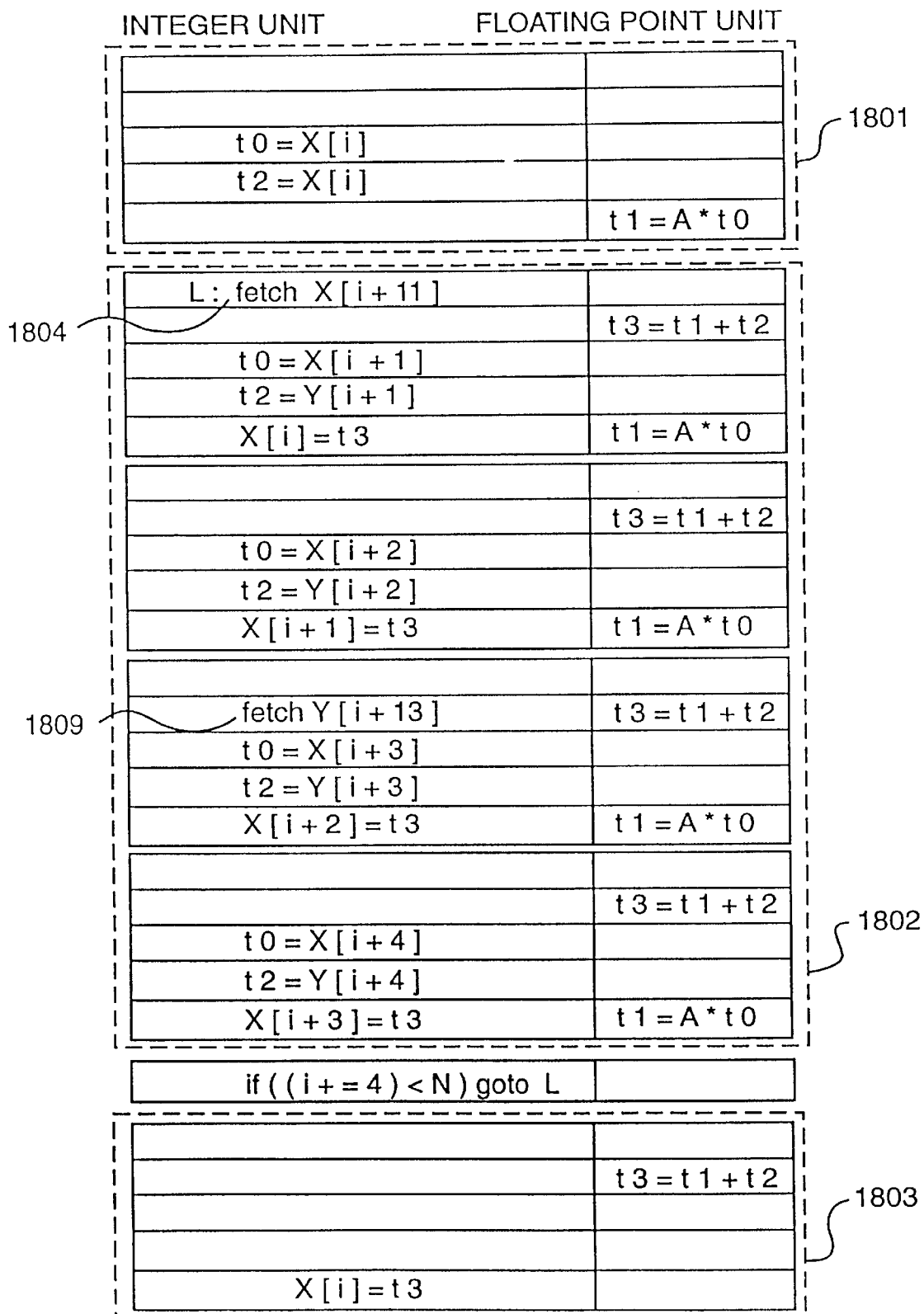
FIG. 18 is an example of the schedule of FIG. 17 having the redundant prefetch instructions deleted according to method 2.

The redundant prefetch instructions for the arrays X and Y are deleted so that one prefetch instruction is generated for every iteration of four times for the instruction schedule of FIG. 17 obtained by development of the loop. Thereby, generation of useless prefetch instructions can be controlled and the schedule shown in FIG. 18 can be obtained. In FIG. 18, the redundant prefetch instructions 1805, 1806, 1807, 1808, 1810 and 1811 are deleted by the prologue section 1802 and the data for iteration of four times can be effectively prefetched by the respective prefetch instructions of the instruction slot 1804 for the array X and the instruction slot 1809 for the array Y.

Method 3

In method 3, the prefetch instructions are scheduled as explained hereunder, considering that useless prefetch instructions are never issued.

(1) Generation of prefetch instructions

The generation of the prefetch instructions is executed in the same manner as for method 1.

(2) Replacement of prefetch instruction and generation of dependency graph

Figure 19:
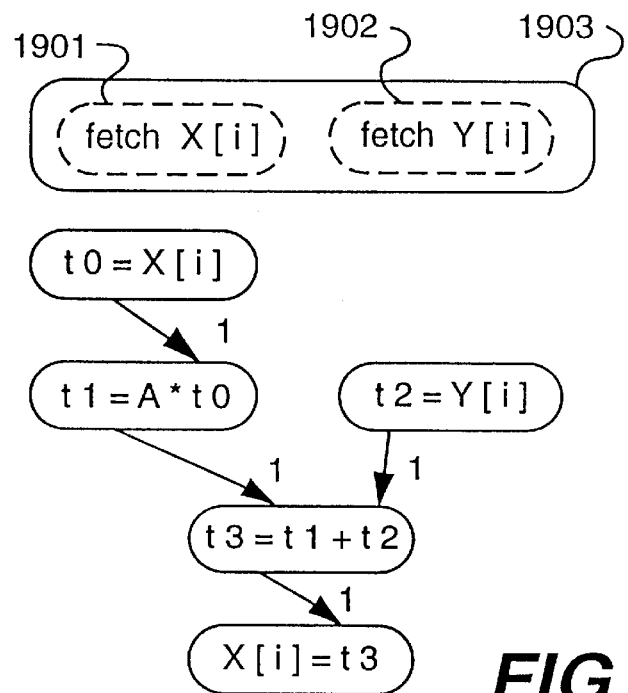
FIG. 19 is an example of a dependency graph generated according to method 3.

A plurality of prefetch instructions generated in item (1) explained above are grouped to form virtual prefetch instructions in order to constitute a dependency graph. The obtained dependency graph is shown in FIG. 19. As shown in FIG. 19, the prefetch instruction 1901 for the array X and the prefetch instruction 1902 for the array Y are combined and are then replaced with the virtual prefetch instruction 1903. Unlike methods 1 and 2, no dependent relationship is provided, in method 3, between the virtual prefetch instruction and the corresponding memory reference instruction.

(3) Software pipelining

Figure 20:
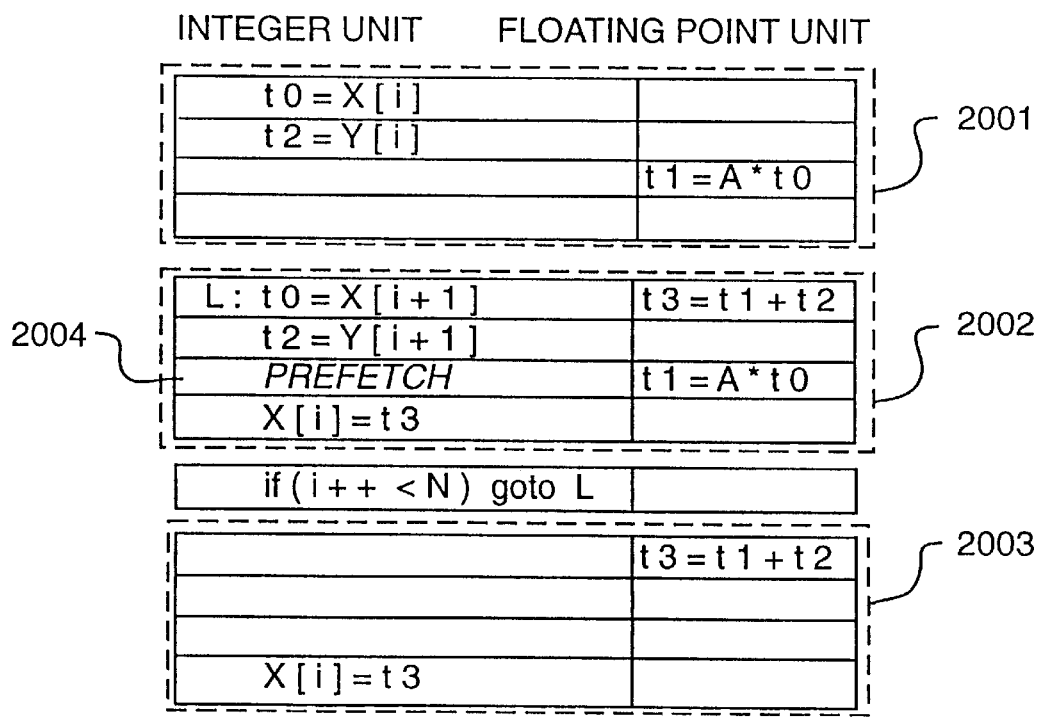
FIG. 20 is an example of the software-pipelined schedule obtained by applying software pipelining to the dependency graph of FIG. 19 according to method 3.

The software pipelining is applied to the loop body to which the virtual prefetch instruction is added. As a result, the software-pipelined schedule can be obtained as shown in FIG. 20. The schedule shown in FIG. 20 is composed of the prologue section 2001, kernel section 2002 and epilogue section 2003. To the instruction generating slot 2004 of the kernel section 2002, the virtual prefetch is scheduled.

(4) Loop development

Figure 21:
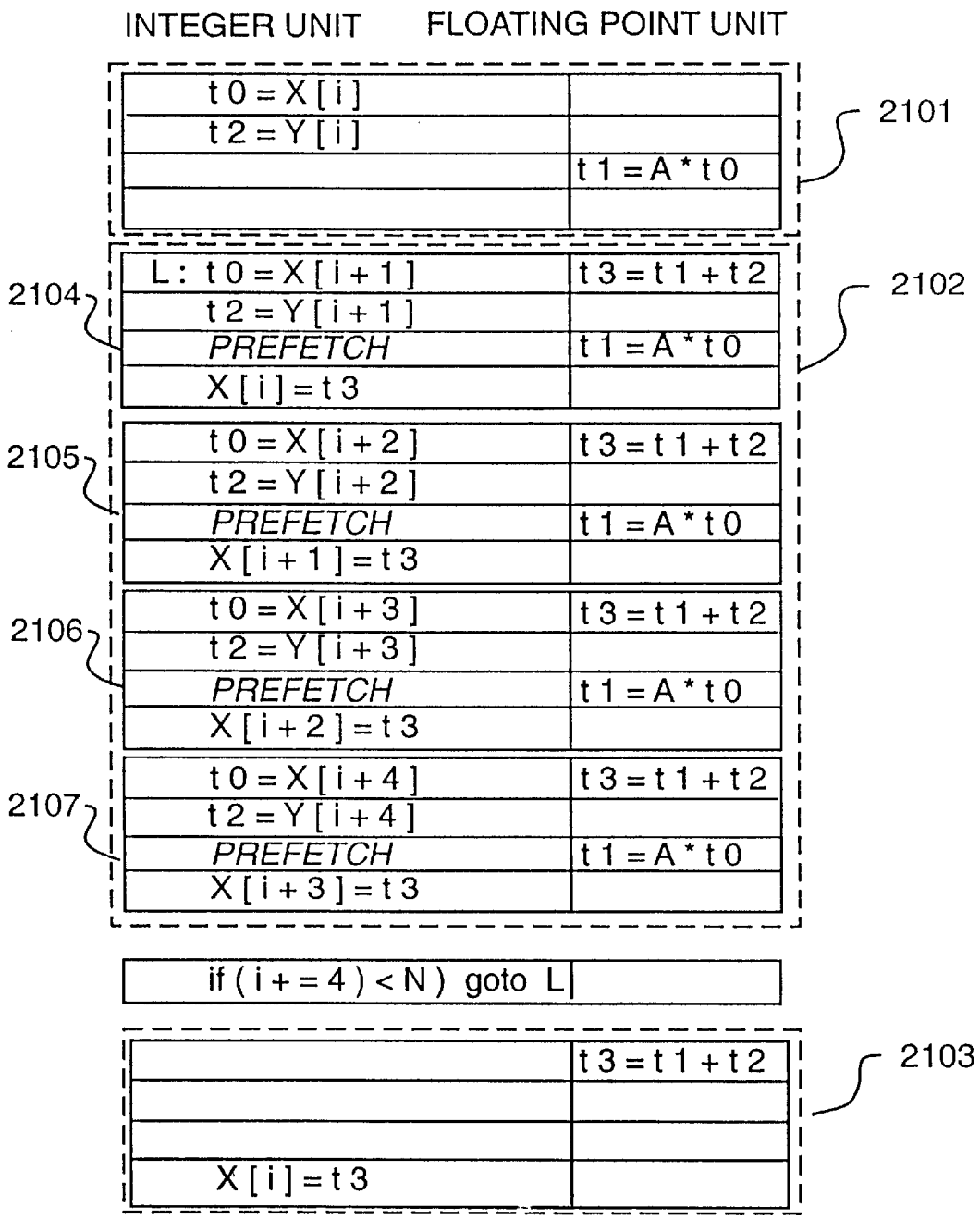
FIG. 21 is an example of the unrolled schedule according to method 3.

Like the case of method 2, the kernel section of the software-pipelined schedule constituted in item (3) explained above is unrolled for four times. Thereby, the schedule shown in FIG. 21 can be obtained. The schedule shown in FIG. 21 is composed of the prologue section 2101, unrolled kernel section 2102 and epilogue section 2103. The virtual prefetch instruction scheduled in the kernel section 2103 by the loop unrolling section is copied into the instruction generating slots 2104, 2105, 2106 and 2107.

(5) Recovery of prefetch address

Figure 22:
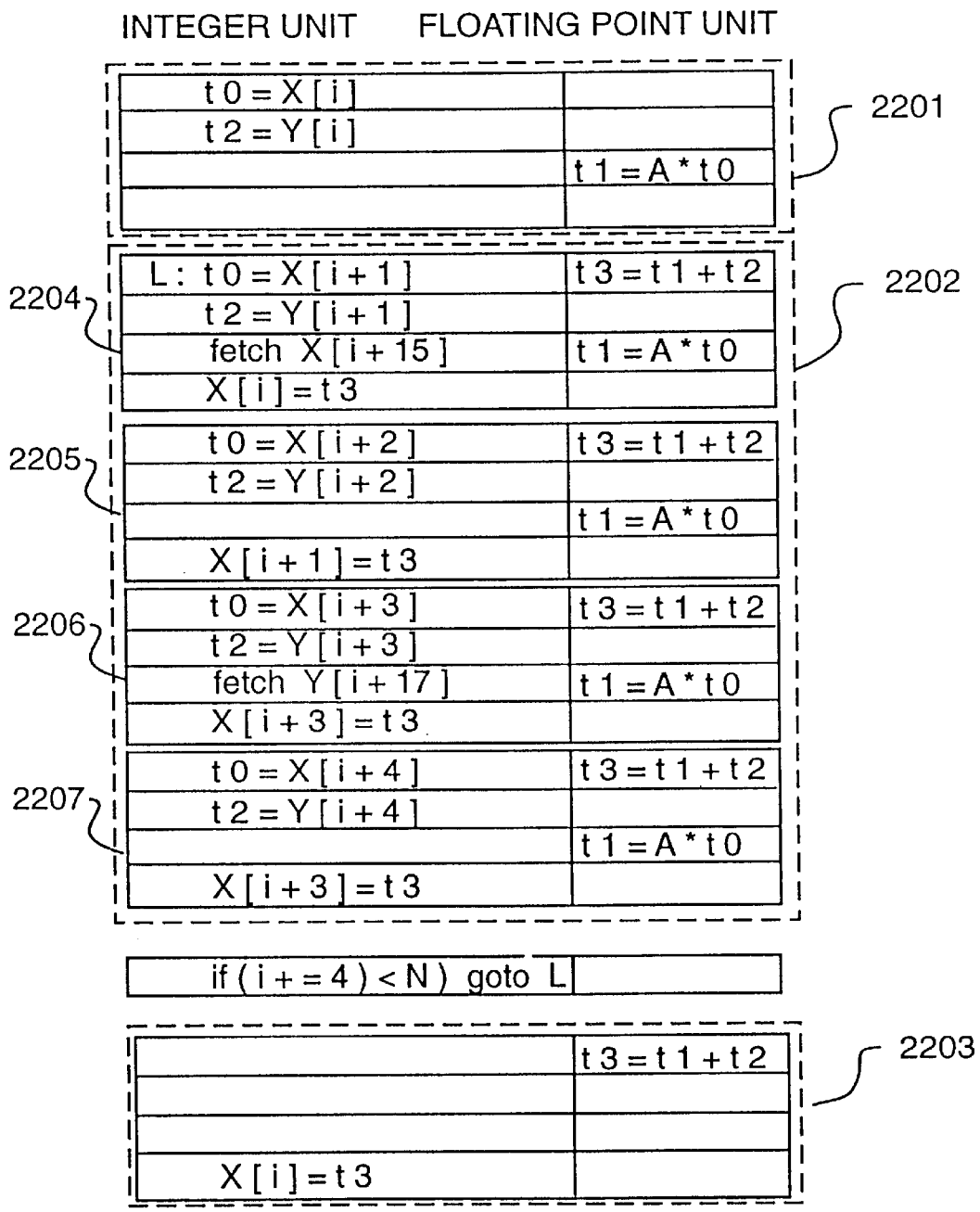
FIG. 22 is an example of the schedule obtained following replacement of the prefetch instructions in method 3.

The virtual prefetch instruction unrolled for the instruction slots 2104, 2105, 2106 and 2107 of the kernel section 2102 of FIG. 21 is replaced with the original prefetch instruction. The result is shown in FIG. 22. Since the virtual prefetch instruction unrolled for the instruction slots 2104, 2105, 2106 and 2107 of FIG. 21 is obtained by replacing the prefetch instruction for the arrays X and Y, the prefetch instruction is inserted into the instruction slots 2204 and 2206 of FIG. 22 so that the prefetch instruction for respective array is generated once for every iteration of four times. In this case, since the number of original prefetch instructions is less than the number of times of iteration for making reference to the data which can be transferred to the cache from the main memory with only a single prefetch operation, the instruction slots 2205 and 2207 for the unrolled virtual prefetch instruction are maintained as the idle slots.

(6) Adjustment of prefetch address

The address as an object of the prefetch is adjusted so that an interval as great as the number of cycles sufficient for termination of the transfer of a cache block to the cache from the main memory is maintained between issuance of the prefetch instruction and the issuance of the instruction for making reference to the data transferred to the cache by the prefetch instruction. Since the cycle required for the transfer of the cache block to the cache from the main memory is 50 cycles and four cycles are required for a single iteration, the reference destination of a prefetch instruction is changed here so that the data referred to after iterations of 14 times is prefetched as shown in FIG. 22.

As explained above, the instruction schedule 103 including the prefetch instruction can be generated by the scheduler 101 using the intermediate language of FIG. 1 as an input. That is, when the reference to data is not continuously performed in the iteration of the loop, since the memory reference instruction corresponding to the prefetch instruction can be issued with an interval as long as the number of cycles required for the transfer of data to the cache from the main memory by utilizing method 1, the waiting time due to the memory reference can be hidden. Moreover, when the reference to data is continuously performed, issuance of the redundant prefetch instructions can be controlled by utilizing methods 2 and 3. In addition, since the dependent relationship is not provided, in comparison with method 2, between the virtual prefetch instruction and the memory reference instruction in method 3, the degree of freedom for the array of instructions increases and since the software-pipelining is applied considering the development of the kernel section, generation of delay time due to the dependent relationship between the instructions can be kept at a minimum.

Although the embodiments of the invention have been described in relation to schedulers, sections, generators, unrolling sections and the like, it is understood that these components of the invention are embodied by software stored in computer memory or on memory storage media for execution by a computer and that the software is executed to enable the methods to be performed by a computer, such as a general purpose computer.

According to the present invention, the waiting time due to memory reference, etc. during execution of the programs can be reduced by effectively scheduling the prefetch instruction. Thereby, the present invention is very effective for high speed execution of the computer programs.

Namely, according to the present invention, if reference to the memory is not performed continuously, the software pipelining can be applied by method 1 keeping sufficiently long intervals between the prefetch instructions and the memory reference instructions. Moreover, when a reference to the memory is performed continuously, the instruction is deleted after application of the software pipelining by method 2 or a plurality of prefetch instructions are replaced with the virtual prefetch instructions by method 3 for application of the software pipelining and thereafter such virtual prefetch instructions are recovered to the original prefetch instructions to control the issuance of the useless prefetch instructions in view of realizing the effective schedule.

We claim:

1. A data prefetch method in a compiler for compiling programs to be executed on a computer having a prefetch instruction for transferring data to a cache memory from a main memory in parallel with execution of other instructions, comprising:
   (a) converting a source program in a loop of a program into intermediate code;
   (b) replacing a plurality of prefetch instructions included in a loop of a program into one virtual prefetch instruction independent of memory reference;
   (c) generating a dependency graph having edges and showing a required delay between said virtual prefetch instruction and an instruction for memory reference in accordance with said intermediate code that is longer than a time required to transfer the data of the virtual prefetch instruction to the cache memory from the main memory;
   (d) executing instruction scheduling by applying software pipelining, for scheduling instructions to hide latency between instructions by execution through overlap of different iterations of the loop, to said dependency graph; and
   (e) unrolling the obtained schedule for a plurality of times to replace said unrolled virtual prefetch instruction with a plurality of initial prefetch instructions.

2. A data prefetch method according to claim 1, wherein said step (e) further comprises adjusting the address which is referred to by said replaced prefetch instruction to the address which is referred to by the iteration which is sufficiently later to complete the data transfer by said prefetch instruction.

3. A data prefetch method in a compiler for compiling programs to be executed on a computer having a prefetch instruction for transferring data to a cache memory from a main memory in parallel with execution of the other instructions, comprising:
   (a) converting a source program in a loop of a program into intermediate code;
   (b) replacing a plurality of prefetch instructions included in a loop of a program into one virtual prefetch instruction independent of memory reference;
   (c) generating a dependency graph having edges and showing a required delay between said virtual prefetch instruction and an instruction for memory reference in accordance with said intermediate code that is longer than a time required to transfer the data of the virtual prefetch instruction to the cache memory from the main memory;
   (d) executing instruction scheduling by applying a software pipelining, for scheduling instructions to hide latency between instructions by execution through overlap of different iterations of the loop, to said dependency graph; and
   (e) unrolling said instruction scheduling,
   wherein said step (e) further comprises:
      (e1) unrolling the obtained schedule for a plurality of times; and
      (e2) replacing said unrolled virtual prefetch instruction with a plurality of initial prefetch instructions.

4. A data prefetch method according to claim 3, wherein said step (e) further comprises adjusting the address which is referred to by said replaced prefetch instruction to the address which is referred to by the iteration which is sufficiently later to complete the data transfer by said prefetch instruction.

5. A compile program stored on a computer readable storage medium executing a data prefetch method on a computer having a prefetch instruction for transferring data to a cache memory from main memory in parallel with execution of the other instructions, comprising:
   (a) converting a source program in a loop of a program into intermediate code;
   (b) replacing a plurality of prefetch instructions included in a loop of a program into one virtual prefetch instruction independent of memory reference;
   (c) generating a dependency graph having edges and showing a required delay between said virtual prefetch instruction and an instruction for memory reference in accordance with said intermediate code that is longer than a time required to transfer the data of the prefetch instruction to the cache memory from the main memory;
   (d) executing instruction scheduling by applying a software pipelining, for scheduling instructions to hide latency between instructions by execution through overlap of different iterations of the loop, to said dependency graph; and
   (e) unrolling said instruction scheduling,
   wherein said step (e) further comprises:
      (e1) unrolling the obtained schedule for a plurality of times; and
      (e2) replacing said unrolled virtual prefetch instruction with a plurality of initial prefetch instructions.

6. A compile program according to claim 5, wherein said step (e) further comprises adjusting the address which is referred to by said replaced prefetch instruction to the address which is referred to by the iteration which is sufficiently later to complete the data transfer by said prefetch instruction.

* * * * *